July 27, 1948.                O. E. ROSEN                2,445,971
                    TRACER CONTROL CUTTER OR GRINDER
Filed Oct. 16, 1944                                 2 Sheets-Sheet 1

INVENTOR.
Oscar E. Rosen
BY

July 27, 1948.                    O. E. ROSEN                    2,445,971
                         TRACER CONTROL CUTTER OR GRINDER
Filed Oct. 16, 1944                                       2 Sheets-Sheet 2

INVENTOR.
Oscar E. Rosen
BY
Swan, Faye & Hardesty
Attys.

Patented July 27, 1948

2,445,971

UNITED STATES PATENT OFFICE 2,445,971

TRACER CONTROL CUTTER OR GRINDER

Oscar E. Rosen, Detroit, Mich., assignor to The Lodge and Shipley Company, Cincinnati, Ohio, a corporation of Ohio Application October 16, 1944, Serial No. 558,826

3 Claims. (Cl. 51—101)

1

The present invention relates to the type of machine wherein a cutter or grinding wheel is controlled in its movements by the action of a tracer on a pattern or template.

Among the objects of the invention is to greatly simplify both the construction and the operation of such machines.

Another object is the tracer control of the grinding of a contour.

Another object is a grinding machine of the type indicated in which provision is made to prevent wheel marks and at the same time increase the life of the grinder between dressing operations.

Still another object is a machine of the type indicated which once in operation, requires little or no attention until the work is completed.

Other objects and advantages will readily occur to those skilled in the art upon reference to the following description and the accompanying drawings in which Figure 1 is a front elevation of a machine made in accordance with the present invention.

Figure 1:
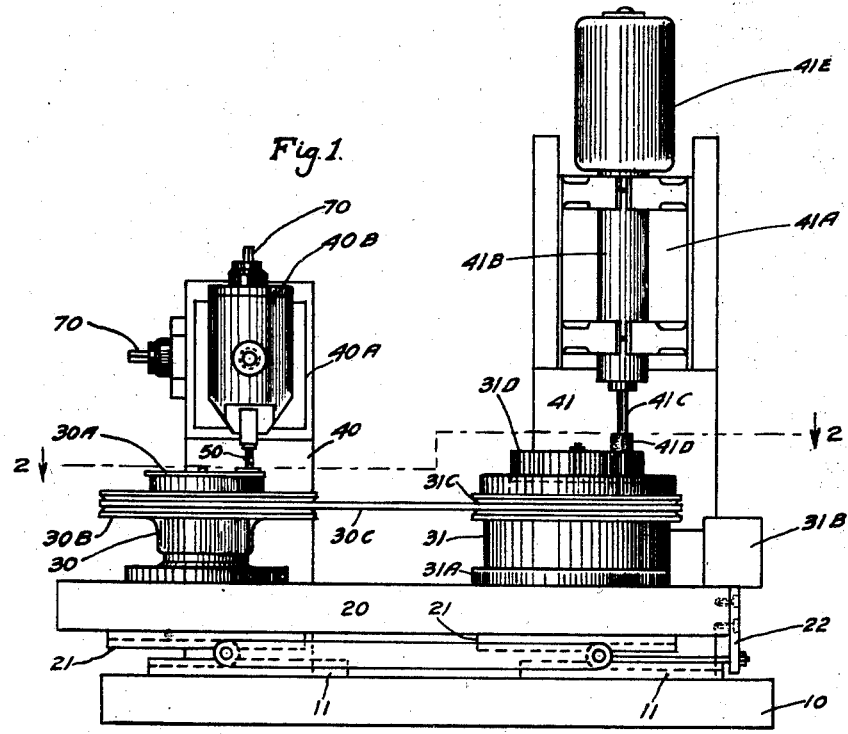
Figure 2:
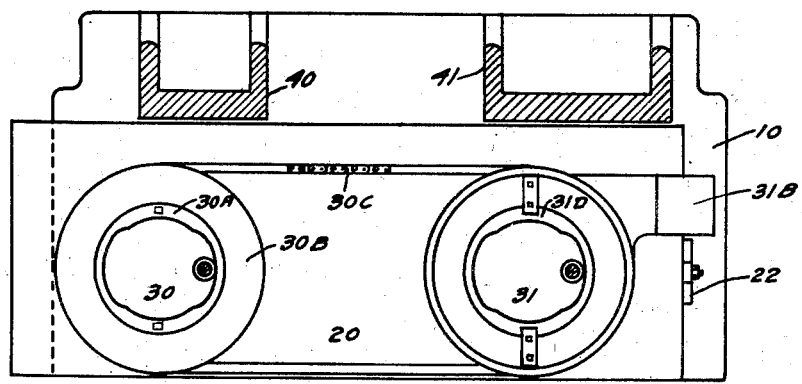
Figure 2 is a section on line 2—2 with parts omitted.

As indicated in the drawings, the invention contemplates a base 10 upon which are fixed a plurality of roller races 11, in which travel a like number of rollers 12 and 12A, each roller 12 being fixed in spaced parallel relation to a roller 12A by means of a pair of links or tieplates 13. Also fixed to base 10 is a longitudinally extending cylinder 15 provided with a piston and piston rod 16, the latter adapted, when in intermediate position, to extend well beyond the roller races 12A.

Mounted upon the rollers 12 and 12A is a movable platform 20, provided on its underside with races 21 similar to races 12 and 12A but inverted over the rollers. It should be noted here that the rollers 12 and 12A should be relatively large and be carefully fitted endwise in the races so as to insure against lateral movement of the platform 20 while allowing free endwise movement thereof.

This platform 20 is provided with a downwardly extending plate 22 to which is fixed the end of piston rod 16, so that when fluid is supplied to the cylinder 15 on either side of the piston, the platform 20 will be moved.

Mounted upon the movable platform 20 are the bases for two turntables 30 and 31, the former 30 being merely a freely rotatable table provided

2 with means for fixing thereto a pattern or template 30A, but provided with a sprocket wheel 30B adapted to coact with a drive chain 30C.

The turntable 31 is also mounted for rotation upon or in a base portion 31A upon which is also mounted a motor 31B which through suitable means may drive the table 31 at any desired speed. The table 31 is also provided with a sprocket 31C coacting with the chain 30C so that in rotating, the table 31 turns also the table 30. The work piece 31D is fixed in any suitable manner to the table 31.

Fixed to the base 10 are two upright supports 40 and 41 constituting vertical ways upon which are mounted the slides 40A and 41A, carrying respectively a tracer unit 40B and cutter or grinder unit 41B. This tracer unit 40B is described and claimed in detail in my copending application Serial No. 486,842, filed May 13, 1943, now Letters Patent No. 2,379,037, June 26, 1945, and consists briefly of a casing containing valve mechanism for controlling the flow of fluid led thereinto from a pressure source, and so long as the finger 50 of the tracer is not moved by contact with the pattern 30A, the flow of fluid to cylinder 15 tends to move the platform 20 toward the left or until the finger 50 makes contact with the pattern. Further movement of the platform then moves the tracer finger and thereby actuates the valve mechanism to cause the pressure fluid in cylinder 15 to tend to move the platform and pattern away from the tracer finger.

Mounted on the support 41 is the cutter or grinder unit 41B consisting of a vertically arranged spindle 41C carrying at its lower end a cutter or grinding wheel 41D, driven by a suitable motor 41E.

Figure 3:
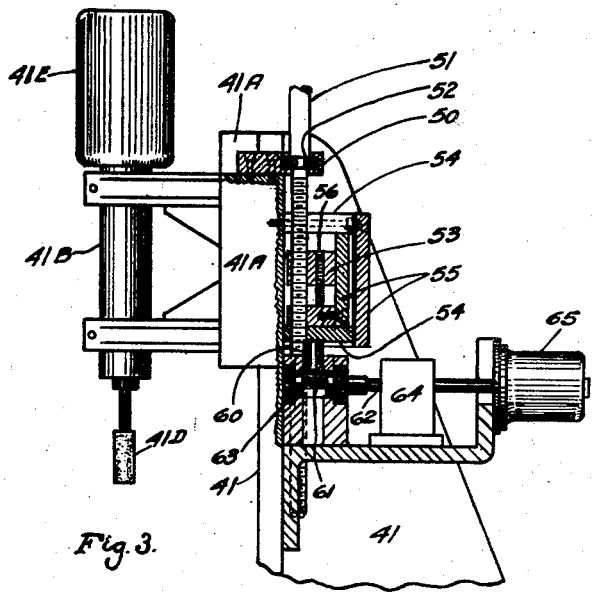
Figure 3 is a vertical sectional view of the tool-carrying slide.
Figure 4:
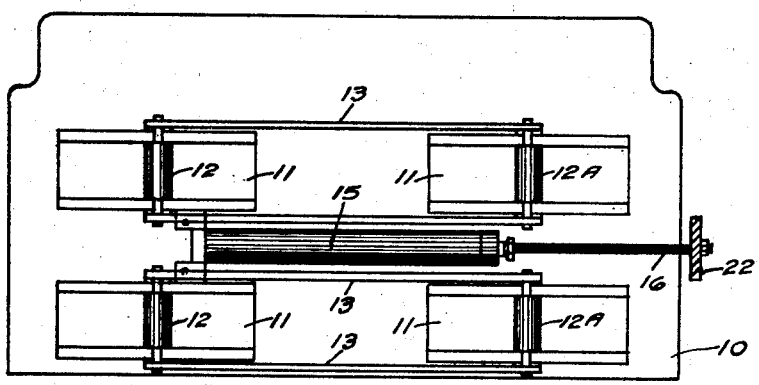
Figure 4 is a view of the base with the movable table removed.

In order to enable the device to be used for grinding, means should be provided for moving the grinder axially as well as rotating it. Such axial movement is provided for in the structure shown in Figure 3. In this figure, the slide 41A, movable vertically in the ways carried by support 41, has fixed to the top thereof a block 50 carrying a jack screw 51, rotatable in the block but fixed against longitudinal movement therein by means of a suitable thrust bearing 52. The screw 51 extends downwardly and is threaded in a traveling nut 53 mounted within a carriage, consisting of horizontal members 54 and vertical members 55, and fixed to the slide 41A. The traveling nut 53 is adjustable with respect to the carriage by means of an adjusting screw 56.

This carriage and the slide 41A fixed thereto are vertically oscillatable by means of a plunger 60 movable up and down by a cam 61 carried by a shaft 62 mounted in suitable antifriction bearings 63 and driven through a reducing gearing 64 by a motor 65.

In setting up the machine for operation, the work piece 31D and the template 30A will be fixed to their respective tables in the same position and at least approximately centered thereon. The tracer finger and cutter or grinder are then arranged in the same relative position, the tracer being capable of accurate adjustment through the use of screw feeds 70.

With the fluid pressure means in operation and the motors 31B and 41E running, the work and pattern are rotated synchronously and the contour of the pattern will be duplicated in the work.

If the work is being ground, the motor 65 will also be used so that the grinder while rotating is slowly moved up and down.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. In a cutting machine, a pair of cables adapted to carry respectively, a template and a workpiece, a tracer and tracer supporting means mounted adjacent that one of said tables carrying the template, and with the tracer in position to be acted upon by said template, a cutter spindle mounted adjacent the other of said tables and in the same position relative to the workpiece as that of the tracer and template, means for continuously rotating said tables at the same rate, means for longitudinally oscillating the cutter spindle, a motor adapted to produce simultaneous lateral movement of said tables and means operatively connecting said tracer and motor whereby to control the operation of said motor in accordance with the action of the template upon said tracer.

2. In a cutting machine, a pair of tables adapted to carry respectively, a template and a workpiece, a tracer and tracer supporting means mounted adjacent that one of said tables carrying the template, a cutter spindle mounted adjacent the other of said tables and in the same position relative to the workpiece as that of the tracer and template, means for continuously rotating one of said tables, means connecting said tables for imparting a similar rotation of the other table, means for longitudinally oscillating the cutter spindle, a motor adapted to produce simultaneous lateral movement of said tables and means operatively connecting said tracer and motor whereby to control the operation of said motor in accordance with the action of the template upon said tracer.

3. In a cutting machine, a base, a slide movable horizontally thereon, supporting means fixed to said base and having mounted thereon in spaced relation a tracer and a vertically arranged cutter spindle and cutter, a pair of tables mounted for rotation about vertical axes upon said slide, means for continuously rotating said tables at the same speed, means for fixing a template to one of said tables in position to act on said tracer, means for fixing a workpiece to the other of said tables in position to be acted upon by said cutter, means for longitudinally oscillating the cutter spindle, and means controlled by said tracer for moving said slide in accordance with the action of said template upon said tracer.

OSCAR E. ROSEN.

REFERENCES CITED

The following references are of record in the file of this patent:

UNITED STATES PATENTS

| Number | Name | Date |
| --- | --- | --- |
| 962,274 | Van Eps | June 21, 1910 |
| 2,111,271 | Nenninger | Mar. 15, 1938 |
| 2,179,388 | Taylor | Nov. 7, 1939 |
| 2,388,555 | Kulhni et al. | Nov. 6, 1945 |

FOREIGN PATENTS

| Number | Country | Date |
| --- | --- | --- |
| 334,698 | Great Britain | Sept. 11, 1930 |

Certificate of Correction

July 27, 1948.

Patent No. 2,445,971.

OSCAR E. ROSEN

It is hereby certified that error appears in the printed specification of the above numbered patent requiring correction as follows: Column 3, line 30, claim 1, for the word "cables" read *tables*; and that the said Letters Patent should be read with this correction therein that the same may conform to the record of the case in the Patent Office.

Signed and sealed this 19th day of October, A. D. 1948.

[SEAL]

THOMAS F. MURPHY,
*Assistant Commissioner of Patents.*